United States Patent [19]

Schweiger

[11] Patent Number: 5,022,509

[45] Date of Patent: Jun. 11, 1991

[54] SEMIAUTOMATIC SHIFTER FOR A MOTOR VEHICLE

[75] Inventor: Klaus Schweiger, Friedrichshafen, Fed. Rep. of Germany

[73] Assignee: Zahnradfabrik Friedrichshafen AG, Friedrichshafen, Fed. Rep. of Germany

[21] Appl. No.: 489,940

[22] Filed: Mar. 6, 1990

[30] Foreign Application Priority Data

Mar. 6, 1989 [DE] Fed. Rep. of Germany ....... 3907151

[51] Int. Cl.$^5$ .................... B60K 41/02; B60K 41/28
[52] U.S. Cl. .................................. 192/73; 192/0.092
[58] Field of Search ............... 192/0.092, 0.052, 0.073, 192/0.08; 74/866

[56] References Cited

U.S. PATENT DOCUMENTS

| 4,079,638 | 3/1978 | Sibeud | 74/866 |
| 4,425,620 | 1/1984 | Batcheller et al. | 74/866 X |
| 4,631,679 | 12/1986 | Klatt | 74/866 X |
| 4,873,637 | 10/1989 | Braun | 74/866 X |
| 4,930,078 | 5/1990 | Dunkley et al. | 74/866 X |

FOREIGN PATENT DOCUMENTS 0170465  1/1989  European Pat. Off. .

OTHER PUBLICATIONS

"Getriebe Mit Grips" (Eaton) Lastauto Omnibus 2/1988, pp. 4–9.

Primary Examiner—Rodney H. Bonck
Attorney, Agent, or Firm—Herbert Dubno; Andrew Wilford

[57] ABSTRACT

A shifting system used in combination with a motor-vehicle engine having an output connected via a clutch to the input of a multiratio transmission in turn having an output connected to a load comprises respective sensors for detecting the speeds of the motor output, transmission input, and transmission output and for generating outputs corresponding thereto, and respective clutch and transmission sensors for detecting the settings of the clutch and transmission and generating outputs corresponding thereto. A shifter element can move between an actuated position and an unactuated position. A double-display has a current-setting part and an ideal-setting part and is connected to a controller that is also connected to the sensors. This controller displays on the current-setting part the current setting of the transmission and on the ideal-setting part a setting calculated to be ideal based at least on engine characteristics and transmission output speed. In addition it resets the transmission by means of its actuator to the ideal setting when same is different from the current setting, the selector element is in the drive position, and the shifter element is actuated. It also disengages and engages the clutch by means of its actuator on any transmission speed change and engaging the clutch by means of its actuator on startup of the motor vehicle from halt.

4 Claims, 2 Drawing Sheets

SEMIAUTOMATIC SHIFTER FOR A MOTOR VEHICLE

FIELD OF THE INVENTION

The present invention relates to a shifter for a motor vehicle. More particularly this invention concerns such a shifter which can be operated manually or automatically to change gears.

BACKGROUND OF THE INVENTION

A standard motor-vehicle drive system has a combustion engine connected via a clutch to a multispeed transmission that in turn drives the load constituted by the vehicle wheels. It is known to provide an electronic controller that is fed inputs corresponding to engine speed, road speed, and transmission setting, and that also itself stores the operating characteristics of the engine and transmission, so that this controller can display and even effect the necessary gear changes. Such a fully automatic system rarely gives satisfactory performance because the shifting cannot be tailored to particular circumstances, for instance an impending stop that would contraindicate an upshift or icy road conditions that would be most safely navigated in a higher gear.

Accordingly semiautomatic drive systems are known. In the EPS system of Daimler-Benz which is used with a 16-speed bus transmission the shift lever does not act directly on the transmission. Instead it can be shifted forward in a slot for upshifting and backward for downshifting, and a display indicates which gear the transmission is in currently. Thus to upshift two gears the lever is pushed forward twice. The driver operates the clutch manually in the conventional manner.

The AVS system of Zahnradfabrik Friedrichshafen has a controller which calculates and displays what gear the vehicle should be traveling in, given engine characteristics, desired road speed (as determined by accelerator-pedal position), and transmission characteristics. The driver can opt for the indicated preferred gear and select it by manual operation of the clutch, or operate a switch and select another gear.

In European patent application 0170465 A of Eaton a so-called SAMT drive is shown which displays, in addition to the currently selected gear, whatever higher and lower gears are still permissible, taking into account maximum and minimum engine speeds and road speed. In this arrangement the clutch is only operated manually for starting from a stop; once rolling the clutch operates automatically.

OBJECTS OF THE INVENTION

It is therefore an object of the present invention to provide an improved semiautomatic shifting system for a motor vehicle with a multispeed transmission.

Another object is the provision of such an improved semiautomatic shifting system for a motor vehicle with a multi-speed transmission which overcomes the above-given disadvantages, that is which automates the shifting operation while still permitting the driver a high degree of control.

A further object is to provide such a system wherein the driver selects at the very least when to shift, if not what gear to shift to.

SUMMARY OF THE INVENTION

The instant invention is a shifting system used in combination with a motor-vehicle engine having an output connected via a clutch to the input of a multiratio transmission in turn having an output connected to a load. The system comprises respective sensors for detecting the speeds of the motor output, transmission input, and transmission output and for generating outputs corresponding thereto, respective clutch and transmission actuators for operating the clutch and shifting the transmission, and respective clutch and transmission sensors for detecting the settings of the clutch and transmission and generating output corresponding thereto. A shifter element can move between an actuated position and an unactuated position and a selector element can move between a drive position, neutral position, and reverse position. A double-display has a current-setting part and an ideal-setting part and is connected to a controller that is also connected to the sensors. This controller displays on the current-setting part the current setting of the transmission and on the ideal-setting part a transmission setting calculated to be ideal based at least on engine characteristics and transmission output speed. In addition it resets the transmission by means of its actuator to the ideal setting when same is different from the current setting, the selector element is in the drive position, and the shifter element is displaced into the actuated position. It also disengages and engages the clutch by means of its actuator on any transmission speed change and engages the clutch by means of its actuator on startup of the motor vehicle from halt.

Whereas in the above-described Eaton system the possibly usable gears are displayed, according to the invention the optimal or ideal gear is shown. One simple actuation of the shifter element selects this gear, at a timing specifically chosen by the driver. Thus, for instance, if the display indicates that a higher speed would be more efficient, but the driver intends to stop momentarily, this indication can be ignored, or if the driver sees that a downslope is ahead upshifting can be delayed for engine braking. The controller only suggests a safe gear, taking into account maximum and minimum engine speeds and current road speed, so that there is little danger of overrevving or underrevving the engine.

At the same time the system automatically operates the clutch on a start from halt, so that the problems of a hill start or the like are eliminated. To start the driver need merely set the selector to the drive position and actuate the accelerator pedal, as in a standard automatic transmission. Once under way shifting can be effected so rapidly by the controller that the gear changes will scarcely be perceptible.

According to another feature of this invention an accelerator pedal is connected to the controller and supplies same with an input corresponding to desired road speed. A kickdown switch connected to the pedal and to the controller automatically shifts the transmission down one gear on full depression of the pedal. Thus to obtain a quick acceleration for passing or the like, the accelerator pedal is floored for an automatic downshift.

It is possible for the selector and shifter to be mounted immediately adjacent one another, for instance on the dashboard adjacent the driver's seat. According to another fature of this invention the selector element is mounted on the dashboard but the shifter element is mounted on the steering column.

When set in the drive position the control means operates the vehicle for forward travel, when in the reverse position for reverse travel, and in the neutral position for no vehicle movement under the power of the engine. Furthermore in accordance with this invention the selector element is displaceable into a manual position and the shifter element is itself displaceable also between an upshift and downshift position The controller shifts the transmission up one gear when the selector element is in the manual position and the shifter element is moved to the upshift position and down one gear when the selector element is in the manual position and the shifter element is moved to the downshift position. This manual shifting allows an experienced driver a very fine control over his or her vehicle. For instance when the road is icy an experienced driver will operate in a higher gear than indicated to avoid skidding when accelerating.

In accordance with a further feature of this invention the vehicle has a steering column and the shifter element is a lever mounted thereon. It can be built like a simple directional control that if pulled up triggers shifting into the controller-indicated ideal gear, if pushed forward effects a manual upshift, and if pulled back effects a manual downshift.

DESCRIPTION OF THE DRAWING

The above and other objects, features, and advantages will become more readily apparent from the following, reference being made to the accompanying drawing in which.

SPECIFIC DESCRIPTION

Figure 1:
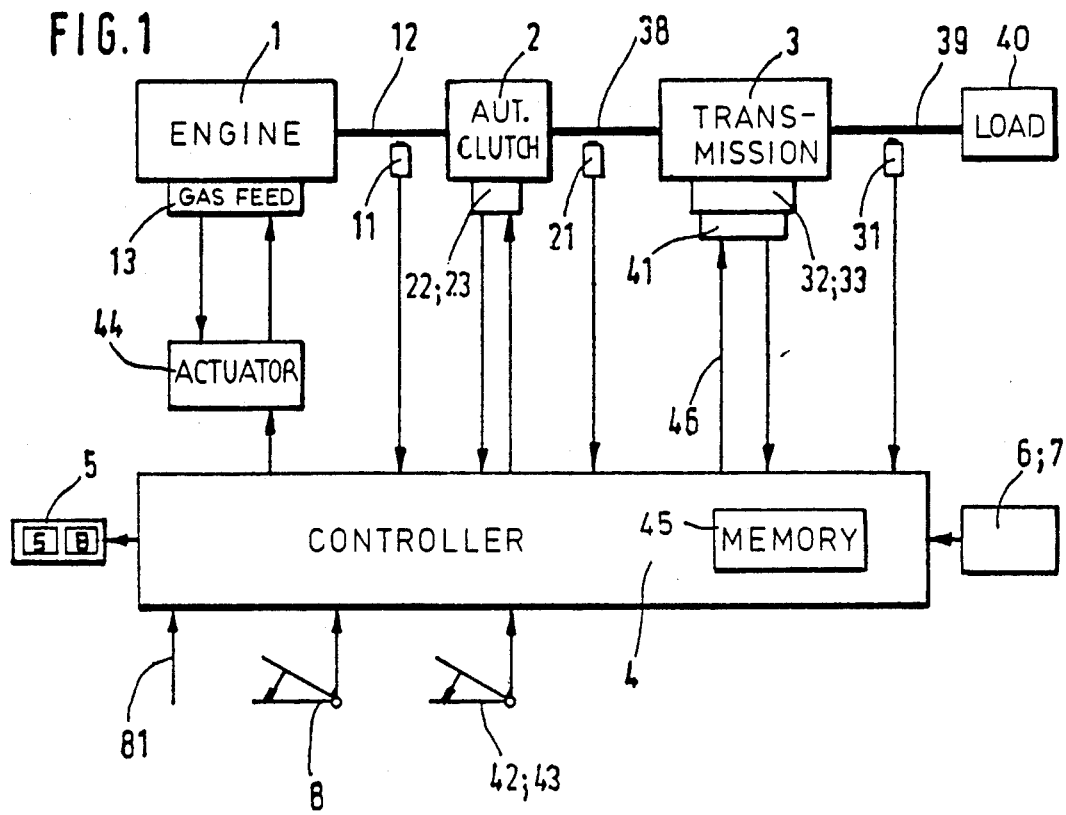
FIG. 1 is a block diagram illustrating the invention.

As seen in FIG. 1 an internal-combustion engine 1 has an output shaft 12 connected via a clutch 2 to an input shaft 38 of a multispeed transmission 3 whose output shaft 39 in turn is connected to a load 40, typically the wheels of the vehicle powered by the engine 1. The engine 1 can be of the gasoline- or diesel-fueled type and has a fuel feed 13 controlled by an electronic actuator 44. The clutch 2 is not of the manual type; instead it has an actuator 22 for operating it and a sensor 23 that gives an output indicating whether it is engaged or not. Similarly the transmission 4 is not of the manual type but has an actuator 32 controlled by a solenoid valve 41 for setting its speeds and a sensor 33 that gives an output indicating what ratio and/or output direction it is set at.

An electronic controller 4 has inputs connected to the sensors 23 and 33 as well as to detectors 11, 21, and 31 respectively associated with the shafts 12, 38, and 39 so as to receive information about the clutch position, transmission setting, motor-output speed $n_M$, transmission-input speed $n_{ae}$, and transmission-output speed $n_{ab}$, which last-named reference signal is in fact directly proportional to ground speed. The controller 4 also receives inputs from speed/ratio selectors 6 and 7, from an accelerator pedal 42 and kick-down switch 43, from a brake pedal 8, and from a line 81 that supplies information about engine braking. The controller 4 drives a display 5 that indicates at 51 (FIG. 3) the gear the transmission 3 is actually in as well as at 52 which gear the controller 4 itself calculates is ideal for the instantaneous circumstances, taking mainly into account the inputs from the sensors 11, 21, 31, and from the accelerator pedal 42 as well as information regarding the operating characteristics of the engine 1 and transmission 3 held in an on-board nonvolatile memory 45. An output 46 leads from the controller 4 to the valve 41 for setting the transmission ratio in accordance with the setting of the input device 6 or 7.

Figure 3:
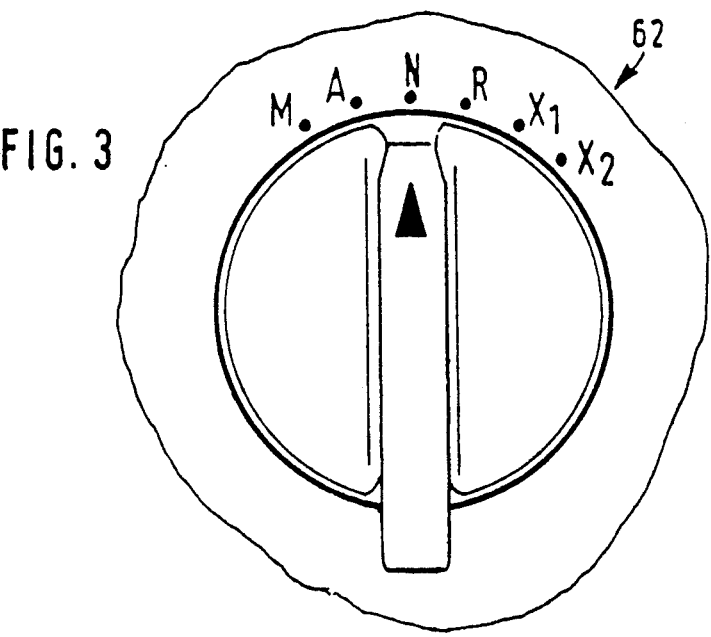
FIG. 3 is a large-scale view of the detail indicated at arrow III in FIG. 2.
Figure 2:
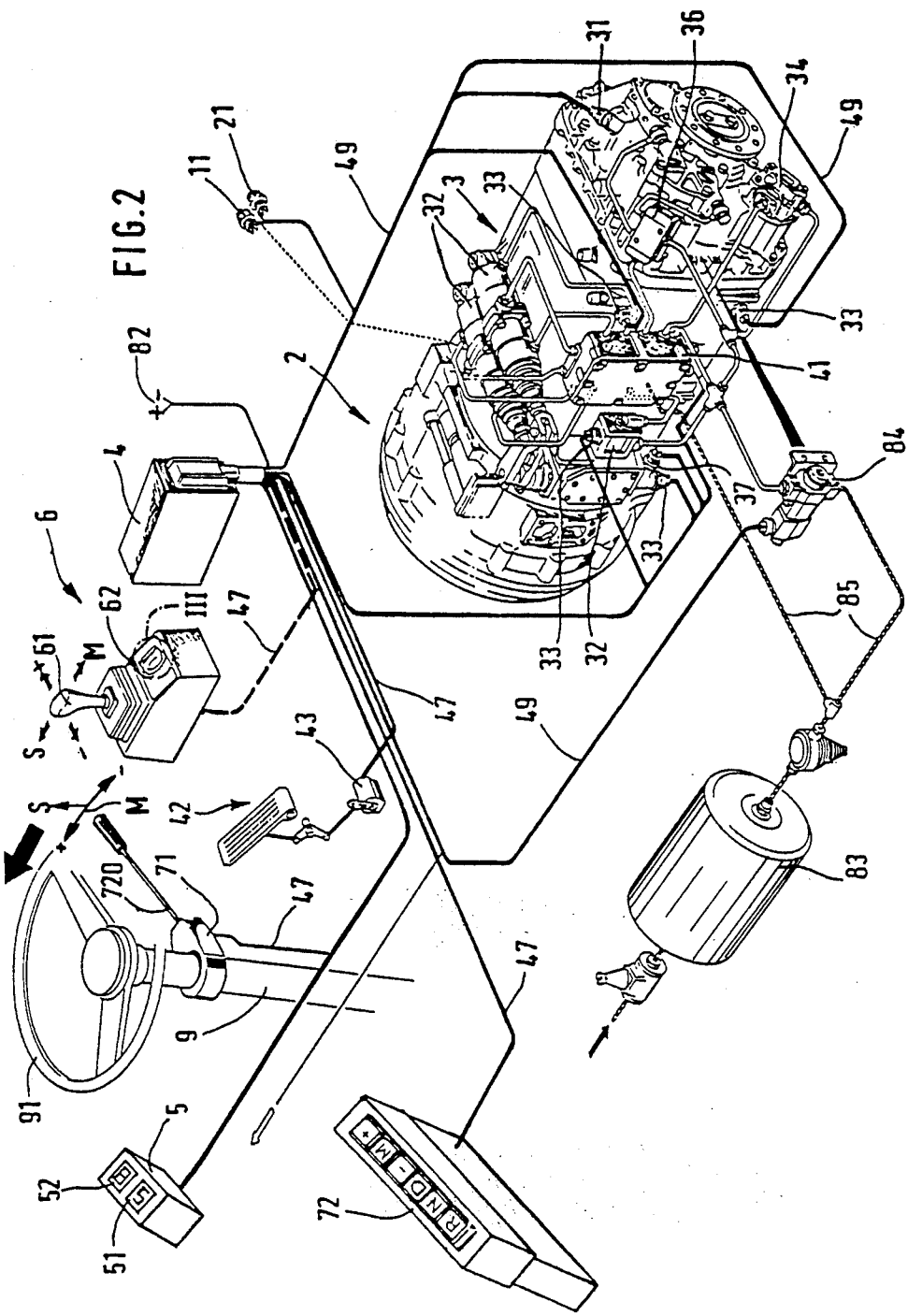
FIG. 2 is a partly diagrammatic perspective view of a drive system incorporating the shifter of this invention.

The system is shown with two separate speed/mode selectors 6 and 7 although in practice only one is normally needed. The selector 6 includes as seen in FIGS. 2 and 3 a joystick 61 that can move forward in a direction S, backward in a direction N, and to the right and to the left as indicates at + and −. Furthermore this selector 6 has a rotary knob 62 that can be set in six positions: M for manual shifting, A (or D) for semiautomatic shifting while traveling forward, N for neutral, R for reverse, and X1 and X2 for programmed shifting setups.

FIG. 3 shows the above-described structure as well as the valves 34, 36, and 37 for the split, range, and neutral. The main valve 84 is shown to be connected via pneumatic lines 85 to a pressure source 83 and via an electric connection 49 to the controller 4 which is supplied with power from an on-board source shown schematically at 82. Electric cables 47 connect the controller 4 to the various inputs.

The mode/gear selector system 7 shown in FIG. 2 comprises a switch 71 mounted on a steering column 9 below the steering wheel 91 and having a lever 720 resembling the stick of a directional signal This lever 720 can be tipped up as indicated by arrow S to cause the controller to shift the transmission 3 from whatever gear it is in as shown at display 51 to whatever gear it calculates is ideal for the circumstances as shown at display 52. Thus to trigger shifting the user need merely flip up the spring-loaded lever 720, giving the driver himself or herself the ability to decide when to shift. In addition when the lever 720 is depressed down from its normal central position to a level M it can be pushed forward as indicated by the + to upshift manually or backward as indicated by the − to downshift through one gear. To downshift through two gears, for instance, takes two backward tugs on the lever 720. Furthermore a button system 72 on the dashboard is provided to select modes, having buttons R, N, and D for reverse, normal, and drive (automatic) as well as an M button for manual operation and + and − buttons for upshift and downshift.

The alternative system 6 comprises the rotary control 62 shown in detail in FIG. 3, plus a joystick 61 that is pushed forward in direction S for shifting to the controller-selected gear. This joystick 61 can be pushed backward and from side to side for manual shifting also, like the lever 720.

Thus with the system of this invention the driver can opt for a semiautomatic shifting mode in which he or she decides when to shift, but lets the controller 4 decide which gear to shift into, or a manual shifting mode in which the gear as well as the time for shifting is decided by the driver. For such manual operation the display 52 can be turned off or set to blink to indicate the mode being employed, and of course the kick-down switch 43 automatically downshifts as is well known in the art.

I claim:

1. In combination with a motor-vehicle engine having an output member connected via a clutch to the input member of a multiratio transmission in turn having an output member connected to a load, a shifting system comprising:

respective sensor means for detecting the speeds of the engine-output, transmission-input, and transmission-output members and for generating outputs corresponding thereto;

respective clutch and transmission actuators for operating the clutch and shifting the transmission;

respective clutch and transmission sensors for detecting the settings of the clutch and transmission and generating outputs corresponding thereto;

a shifter element displaceable between an actuated position and an unactuated position;

a selector element displaceable between a drive position, neutral position, and reverse position;

a double-display having a current-setting part and an ideal-setting part;

control means connected to and receiving the outputs from the sensor means and connected to the display, actuators, and elements for
- displaying on the current-setting part the current setting of the transmission,
- displaying on the ideal-setting part a transmission setting calculated to be ideal based at least on engine characteristics and transmission output speed,
- resetting the transmission by means of its actuator to the ideal setting when same is different from the current setting, the selector element is in the drive position, and the shifter element is displaced into the actuated position, and
- disengaging and engaging the clutch by means of its actuator on any transmission speed change and engaging the clutch by means of its actuator on startup of the motor vehicle from halt; and an accelerator pedal connected to the control means and supplying same with an input corresponding to desired road speed; and a kickdown switch connected to the pedal and to the control means for automatically shifting the transmission down at least one gear on full depression of the pedal.

2. The shifting system defined in claim 1 wherein the vehicle has a dashboard on which the selector element is mounted and a steering column on which the shifter element is mounted.

3. The shifting system defined in claim 1 wherein the selector element is displaceable into a manual position, the shifter element being displaceable also between an upshift and downshift position, the control means shifting the transmission up one gear when the selector element is in the manual position and the shifter element is moved to the upshift position and down one gear when the selector element is in the manual position and the shifter element is moved to the downshift position.

4. The shifting system defined in claim 3 wherein the vehicle has a steering column and the shifter element is a lever mounted thereon.

* * * * *